US006758254B2

(12) United States Patent
Moore et al.

(10) Patent No.: US 6,758,254 B2
(45) Date of Patent: Jul. 6, 2004

(54) METHOD AND APPARATUS FOR REMOVING AND APPLYING ADHESIVE COMPONENTS

(75) Inventors: Eric Moore, Phoenix, AZ (US); Steve Gunnerson, Phoenix, AZ (US)

(73) Assignee: Nautilus Systems, Inc., Tempe, AZ (US)

(*) Notice: Subject to any disclaimer, the term of this patent is extended or adjusted under 35 U.S.C. 154(b) by 98 days.

(21) Appl. No.: 09/978,743

(22) Filed: Oct. 16, 2001

(65) Prior Publication Data

US 2003/0070750 A1 Apr. 17, 2003

(51) Int. Cl.[7] ......................... B44C 1/165; B32B 31/20; B65C 9/18; B65C 9/26; B65H 5/00

(52) U.S. Cl. ....................... 156/540; 156/361; 156/362; 156/541; 156/542; 156/DIG. 33; 156/64; 221/73

(58) Field of Search ................................ 156/361, 362, 156/540, 541, 542, 556, 580, DIG. 1, DIG. 33, DIG. 40, 64; 221/73

(56) References Cited

U.S. PATENT DOCUMENTS 4,132,583 A 1/1979 Hodgson
4,255,220 A 3/1981 Kucheck et al.
4,816,109 A 3/1989 Ingram
5,304,264 A * 4/1994 Wehrmann .................. 156/64
5,403,146 A 4/1995 Jones
5,403,431 A 4/1995 Goto
5,849,143 A * 12/1998 Ingals et al. ................ 156/556
5,853,530 A 12/1998 Allen
5,938,890 A * 8/1999 Schlinkmann et al. ...... 156/541

FOREIGN PATENT DOCUMENTS

EP 0 854 091 A1 1/1998

* cited by examiner

*Primary Examiner*—J. A. Lorengo
(74) *Attorney, Agent, or Firm*—Snell & Wilmer L.L.P.

(57) ABSTRACT

A method and apparatus for removing adhesive backed components from a carrier tape and applying them onto a substrate which utilizes a retracting blade having a top surface for positioning the adhesive backed components. Extension of the retracting blade and advancement of the carrier occur simultaneously and independently from one another thereby enabling a significant reduction in cycle times.

16 Claims, 7 Drawing Sheets

METHOD AND APPARATUS FOR REMOVING AND APPLYING ADHESIVE COMPONENTS

FIELD OF INVENTION

The present invention relates, generally, to an apparatus for removing components having an adhesive backing from a carrier tape and applying those components directly onto a substrate or item, and a method for doing the same. More particularly, the present invention is directed to an automated method and apparatus for removing and applying adhesive backed components to a substrate or other item utilizing a retracting blade assembly wherein the movement of the retracting blade assembly does not move the carrier or change the position of any components contained on the carrier.

BACKGROUND OF THE INVENTION

There are a number of label applicators known in the prior art. Labels are frequently packaged on a carrier liner or web tape and rolled up to hold a large volume of labels. A typical automated application system allows the user to load a roll of labels and string the carrier liner or web tape through various rollers and drives that provide tension and automatic feed capability. Although many of these label applicators are described with specific reference to the application of labels, many of the same components and concepts used in these applicator systems may apply to the application of other items in addition to labels.

For example, U.S. Pat. No. 4,132,583, issued to Hodgson, discloses an automatic applicator that applies strip-mounted labels to both flat and curved objects. A pressure foot applies a label already positioned on the foot to an object that is brought into position by pressing the entire surface of the label against the object. The label strip is advanced over a stripper plate by a preset amount that is determined by a label edge sensor as each object moves out of position. Meanwhile, the pressure foot simultaneously swings toward the stripper plate and picks up the next label being peeled from the strip.

In another example, U.S. Pat. No. 4,255,220, issued to Kucheck et al., describes a label applicator having a supporting structure and a label receiver mounted on the supporting structure for movement between a retracted position and an extended position. A label dispenser supplies a label to the label receiver when the label receiver is in the retracted position and the label is transferred by an air blast from the label receiver to an article when the label receiver is moved to the extended position. In still another example, U.S. Pat. No. 5,849,143, issued to Ingalls, describes a precision label application system for applying adhesive labels from a feed web onto flat uniform size articles. The advance of the article to be labeled and the advance of the current label to be applied are mechanically linked to occur in unison so that forward advancement speed of the article and the current label are matched exactly.

In yet another example, U.S. Pat. No. 5,835,530, issued to Allen discloses a label applicator having a supporting structure, a label receiver having a receiving face and being adapted to receive and releasably retain a label, and a label dispenser adapted to dispense a label onto the receiving face. The dispenser is further adapted to blow gas against the trailing and lower edges of the label as it is transferred from the label dispenser onto the receiving face to assist moving the label onto the receiving face. The receiving face is fitted with a stop plate and, after positioning the label on the receiving face, the label is applied to the article.

Still other patents describe methods and apparatus for peeling and applying adhesive components, including labels, double sided adhesive strips, gaskets, and thermal transfer tapes, onto other items. In U.S. Pat. No. 5,938,890, issued to Schlinkmann et al., a system for peeling and applying an adhesive component is described which is based on one or more sensors that locate the component and feed the component on its web tape on the surface of a retracting blade to a specified position underneath a vacuum chuck. The vacuum chuck then presses against the component, its web tape, and the retracting blade underneath the web tape, while a clamp simultaneously clamps the web tape to arrest its motion. The clamp is positioned before the retracting blade so that a drive roller system can only take up the web tape between itself and the clamp when it is engaged. When the component is securely held by the vacuum, the drive roller system begins pulling the web tape thereby causing the retracting blade to retract and peel the web tape from underneath the component. The vacuum chuck then places the component onto an item and returns to its home position. The drive roller system feeds the carrier in the reverse direction, creating slack, and allowing a spring device attached to the blade to return the blade to its extended position.

A key factor in the process described above with reference to Schlinkmann is the use of a retracting blade. The retracting blade is a moving plate that the web tape travels over. When the retracting blade is fully extended, the web tape can be fed over it and the blade serves as a surface to push against when gaining hold of the component. In this type of apparatus, the blade is usually attached to a spring device that applies pressure to keep the blade at the extended position. When the web tape is clamped at a position before the retracting blade, the drive assembly pulls on the web tape and the tension on the web tape overcomes the force of the retracting blade spring causing the retracting blade to retract. As long as the vacuum pressure is sufficient, the adhesive component will remain in position on the vacuum chuck and will be released from the web tape.

Although the presently known methods and apparatus for peeling and applying adhesive backed components are automated for efficiency, there is a need for a method and apparatus for applying components that requires fewer motions and exhibits faster speeds in order to significantly reduce the overall cycle time. There is also a need for a method and apparatus where a web tape or carrier for carrying components is not subject to high tensions which sometimes result in breaks and tears in the web tape or carrier thereby causing system downtime.

SUMMARY OF THE INVENTION

Briefly, the present invention is directed to a method and apparatus for removing and applying adhesive backed components to a substrate where advancement of a carrier, which contains the adhesive backed components, and movement of a retracting blade occur simultaneously to improve or decrease cycle time. The method and apparatus also include the use of a tensioner which functions to maintain the tension of the carrier in order to avoid limiting acceleration of blade extension and retraction speeds as well as breaks and tears in the carrier.

In accordance with one embodiment of the present invention, an apparatus for removing an adhesive backed component from a carrier and applying the component onto a substrate includes a first means for capturing the carrier, a second means for capturing the carrier, a retracting blade assembly located between the first and second capturing means having a top surface of a retracting blade for retaining a portion of the carrier, a first roller affixed to, and moving with, the retracting blade which rotates while the retracting blade is in motion, and a second roller permanently affixed in place between the first roller and the second capturing means which rotates when the carrier is moved through the apparatus.

In accordance with one aspect of the invention, the first capturing means comprises a web clamp or a brake and the second capturing means comprises a feed drive roller and pinch drive roller combination or similarly functioning element or elements including, but not limited to, a take up feature with an encoder, a linear actuator with a clamp, or a tractor feed used in combination with holes formed through the carrier.

In accordance with another aspect of the present invention, the apparatus for removing an adhesive backed component from a carrier and applying it to a substrate may also include a tension element which applies tension to the carrier in order to maintain a predetermined tension of the carrier.

In accordance with yet another aspect of the present invention, the retracting blade assembly further includes an element or elements that produce a controlled linear motion for moving the top surface of the retracting blade. The element or elements may include, but are not limited to, a rack and pinion with a gear motor, a linear motor, a voice coil actuator, a motor belt configuration, or any other means known in the art for producing a controlled linear motion.

In accordance with still another aspect of the present invention, the retracting blade is capable of extending to a predetermined position while the feed drive roller advances the carrier to a predetermined location so that the retracting blade and the carrier move simultaneously and independently from one another. Further, movement of the retracting blade assembly does not result in movement of the carrier located on the top surface of the retracting blade.

In accordance with yet another aspect of the present invention, the apparatus may include one or more sensors positioned over the retracting blade which assist in sensing a feature of the component or portion of the carrier and inputting information related to its location so that the retracting blade and carrier can be extended and advanced to their predetermined position and location, respectively. The predetermined position and location for the retracting blade and carrier may be preprogrammed using computer software. Also, the linear acceleration and velocity of the carrier controlled by the second capturing means may be synchronized with the linear acceleration and velocity of the retracting blade by electrical or mechanical means.

In another embodiment of the present invention, a method for removing an adhesive backed component from a carrier and applying the component onto a substrate is presented which includes the steps of positioning a carrier tape having adhesive backed components over a top surface of a retracting blade, simultaneously extending the retracting blade and the carrier tape to a predetermined position; applying a vacuum chuck to a component on the carrier located at the predetermined position, removing the component from the carrier with the vacuum chuck by retracting the retracting blade, applying the component to a substrate utilizing the vacuum chuck, and retracting the vacuum chuck to its original starting position.

Advantages of the present invention include a significant reduction in cycle times as a result of advancing the carrier while simultaneously extending the retracting blade, and elimination of the need for the carrier to travel around the edge of the retracting blade as it advances thereby reducing rippling in the carrier that can cause misreading of the carrier position by the sensor(s). Furthermore, retracting blade extension and retraction velocities are not limited by the properties of the carrier.

BRIEF DESCRIPTION OF THE DRAWINGS

The present invention will hereinafter be described in conjunction with the appended drawing figures, wherein like numerals designate like elements in the various figures, and wherein.

DETAILED DESCRIPTION OF EXEMPLARY EMBODIMENT OF THE PRESENT INVENTION

The present invention is directed to a method and apparatus for removing and applying adhesive components. The apparatus is designed to reduce overall cycle time for removing an adhesive component from a carrier and applying the component to a substrate by simultaneously and independently advancing the carrier over the top surface of a retracting blade and extending the retracting blade such that movement of the retracting blade does not cause movement of the carrier.

Figure 1:
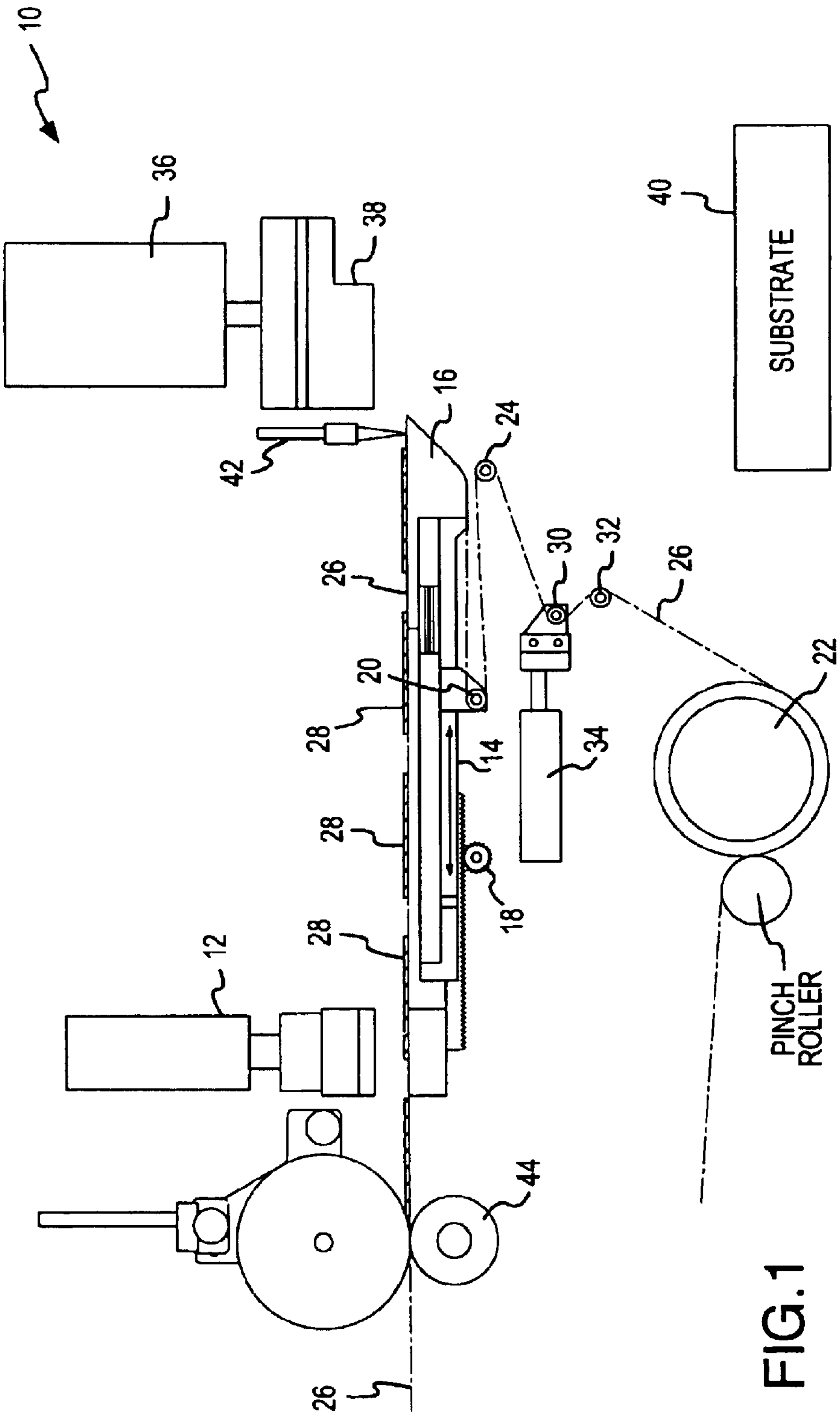
FIG. 1 is a schematic side elevational view of the apparatus of the present invention with the retracting blade shown in the retracted position.

A schematic side elevational view of an exemplary apparatus of the present invention with the retracting blade shown in the retracted position is shown in FIG. 1.

The apparatus 10 for removing and applying adhesive components includes a first means for capturing a carrier 12 having at least one adhesive component contained thereon, a retracting blade assembly 14 having a retracting blade 16, a blade drive gear 18, and a first roller 20 attached to the retracting blade 16, a second means for capturing the carrier 22, and a second permanently affixed roller 24 for directing the feed path of the carrier. The adhesive-backed components 28 are retained on a carrier tape 26 which is threaded through the apparatus 10 to create a carrier path. Additional guide rollers 30, 32 may also be included to further direct carrier 26 along its carrier path. The apparatus also includes a releasable storage means for storing a full carrier roll (not shown) and may also include a means for taking up and storing the carrier after all the components are removed from the carrier (not shown).

Further, apparatus 10 may also include a tensioning element 34 which functions to apply pressure to carrier 26 in order to maintain a predetermined tension. Guide roller 30 is attached to tensioning element 34 and tensioning element 34 is engaged when retracting blade 16 is retracted. Functional elements for tensioning element 34 may include, but are not limited to, a spring actuator, an electric actuator, or a gas cylinder. Apparatus 10 also includes a tamp assembly 36 having a vacuum chuck 38 which is used to assist the removal of an adhesive component 28 from retracting blade 16 and applying it to a substrate 40.

Apparatus 10 may also include a sensor 42, such as an optical sensor, for example, which aids in extending and advancing the retracting blade 16 and carrier 26, respectively, to their predetermined positions by sensing a feature of the component or portion of the carrier and inputting or feeding that information into preprogrammed software. Apparatus 10 may also include a slip clutch assembly 44 for maintaining a continuous minimum tension on the carrier.

FIG. 1 shows retracting blade 16 of apparatus 10 in a retracted position with carrier 26 shown threaded across a top surface of retracting blade 16, down around the edge of retracting blade 16, around first roller 20 attached to retracting blade 16, around second permanently affixed roller 24, around guide roller 30 attached to tensioning element 34, around guide roller 32, and wrapped around second capturing means 22 which is shown as a feed drive roller and pinch drive roller combination in FIG. 1. Other embodiments for second capturing means 22 include, but are not limited to, a take up feature with an encoder, a linear actuator with a clamp, or a tractor feed used in combination with holed formed through the carrier. In contrast to other prior art systems, the retracting blade is no longer attached to a spring which must be overcome for movement, but is instead controlled by an element or elements that produce a controlled linear motion including, but not limited to, a rack and pinion with a gear motor (as shown in FIGS. 1–5), a linear motor, a voice coil actuator, a motor belt configuration, or any other functional element or elements known in the art for producing a controlled linear motion.

Figure 2:
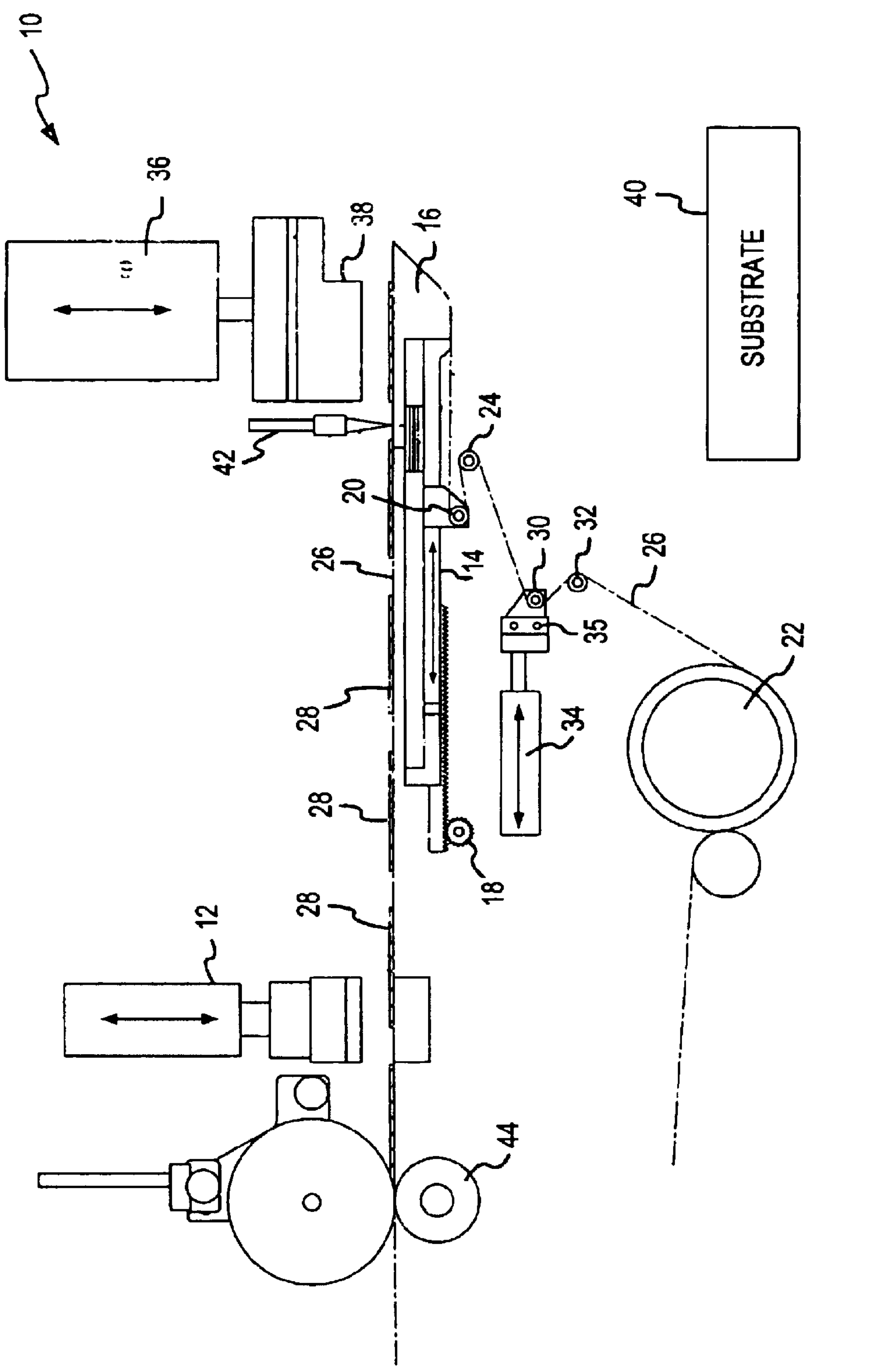
FIG. 2 is a schematic side elevational view of the apparatus of the present invention with the retracting blade shown in the extended position.

In FIG. 2, a schematic side elevational view of apparatus 10 of the present invention is shown with retracting blade 16 in an extended position. Retracting blade 16 moves forward to its extended position while feed drive roller 12 simultaneously advances carrier 26 to a predetermined location based on input from sensor 42. Extension of retracting blade 16 to a predetermined position is also based upon input from sensor 42. It should be noted that more than one sensor may be used to aid in determining the positioning of retracting blade 16 and carrier 26 when they are extended and advanced, respectively. During use, one or more sensors may sense a feature of the component or portion of the carrier and input or feed that information into preprogrammed software which computes the distance that either the retracting blade 16 or carrier 26 must be moved to be aligned with their preprogrammed predetermined positions.

Further, linear acceleration and velocity of carrier 26, which is controlled by second capturing means 22, can be synchronized with the linear acceleration and velocity of retracting blade 16 through mechanical or electronic means, thereby creating a zero velocity for carrier 26 relative to retracting blade 16. Accordingly, since carrier 26 is not traveling around the edge of retracting blade 16 as it advances, rippling in carrier 26 that can cause misreads by sensor 42 of the carrier position is reduced. In FIG. 2, retracting blade 16 is fully extended and second capturing means 22 has stopped, thereby positioning an adhesive component 26 precisely under vacuum chuck 38.

Figure 3:
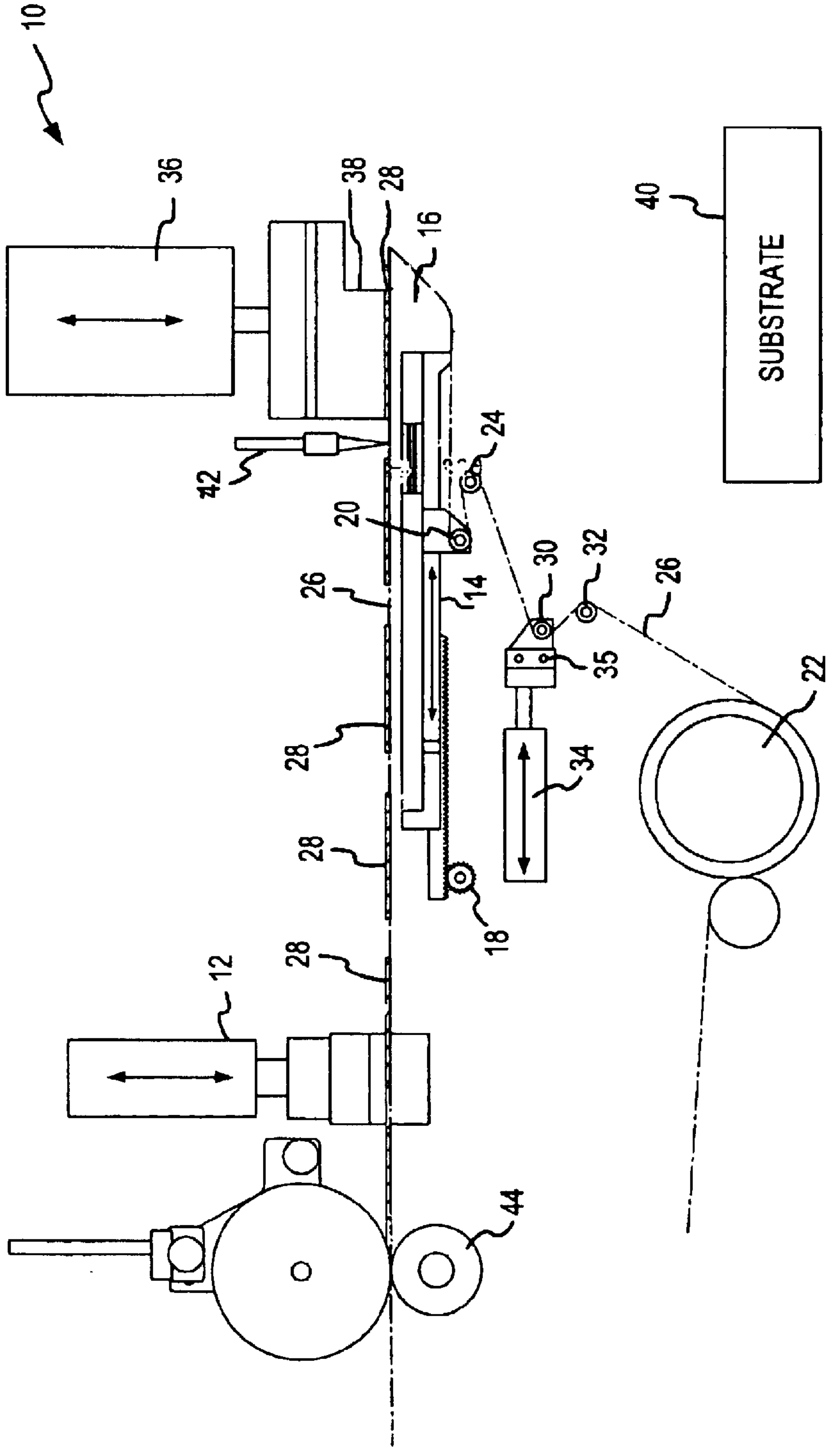
FIG. 3 is a schematic side elevational view of the apparatus of the present invention shown with the vacuum chuck and clamp applying pressure to the carrier.

Next, in FIG. 3, a side elevational view of apparatus 10 of the present invention is shown with vacuum chuck 38 and clamp 12 applying pressure to carrier 26. Tamp assembly 36 and clamp 12 both extend downward. The downward extension of tamp assembly 36 results in vacuum chuck 38 engaging adhesive component 28 which has been precisely positioned over retracting blade 16 by utilizing sensor 42. At the position of the apparatus depicted in FIG. 3, vacuum chuck 38 presses on adhesive component 28, its carrier 26, and a top surface of retracting blade 16 which is located underneath carrier 26. As previously stated, clamp 12 simultaneously clamps carrier 26 to arrest its motion and second capturing means 22 is also held stationary to arrest carrier motion. When component 28 is securely held by vacuum chuck 38, blade drive gear 18, which includes a motor, turns a specified number of counts to retract retracting blade 16. During this retraction of retracting blade 16, second capturing means 22, such as a feed drive roller shown in this embodiment, does not move.

Figure 4:
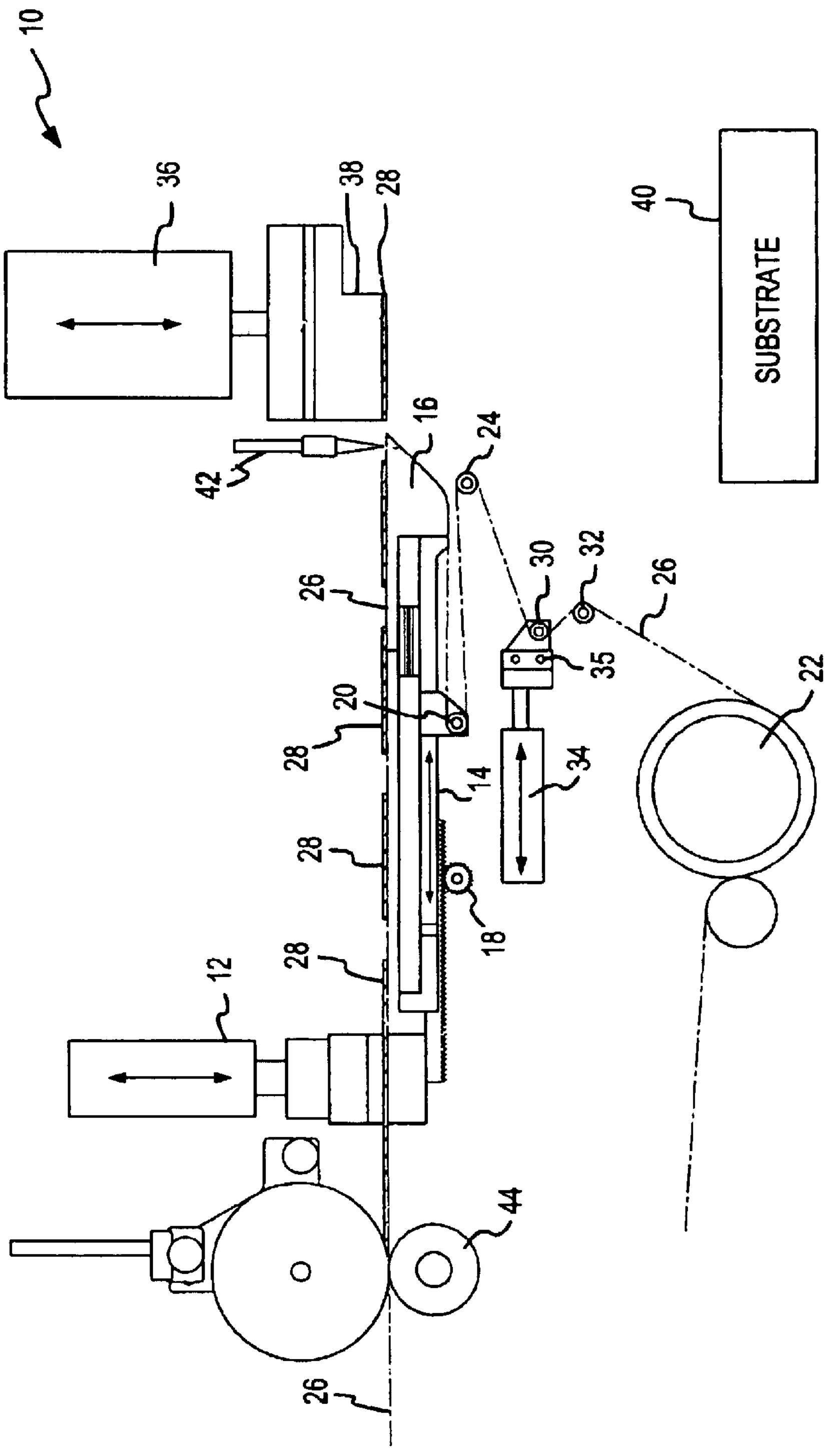
FIG. 4 is a schematic side elevational view of the apparatus of the present invention shown with a component from the carrier captured on the vacuum chuck.

A schematic side elevational view of apparatus 10 of the present invention shown with a component 28 from carrier 26 captured on vacuum chuck 38 and retracting blade 16 in a retracted position is shown in FIG. 4. With feed drive roller 22 held stationary, blade drive gear 18 retracts retracting blade 16, resulting in carrier 26 being peeled away from adhesive component 28 leaving it captured on vacuum chuck 38.

FIG. 3 shows retracting blade 16 at its fully extended position. First roller 20 attached to retracting blade 16 moves with retracting blade 16 as it is extended while second roller 24 and additional guide rollers 30 and 32 are stationary. As previously stated, if web clamp 12 is engaged and feed drive roller 22 is held stationary, retracting blade 16 can move to its retracted position without moving carrier 26. FIG. 4 shows retracting blade 16 at its fully retracted position. It should be noted that the change in position of retracting blade 16 from FIG. 3, at its fully extended position, to FIG. 4, at its fully retracted position, is the same as the change in the position of the center line of first roller 20 from FIG. 3, where retracting blade 16 is at its fully extended position, and FIG. 4, where retracting blade 16 is at its fully retracted position. As previously stated, because first roller 20 actually rotates against carrier 26 as retracting blade 16 moves, carrier 26 does not change its position.

Figure 5:
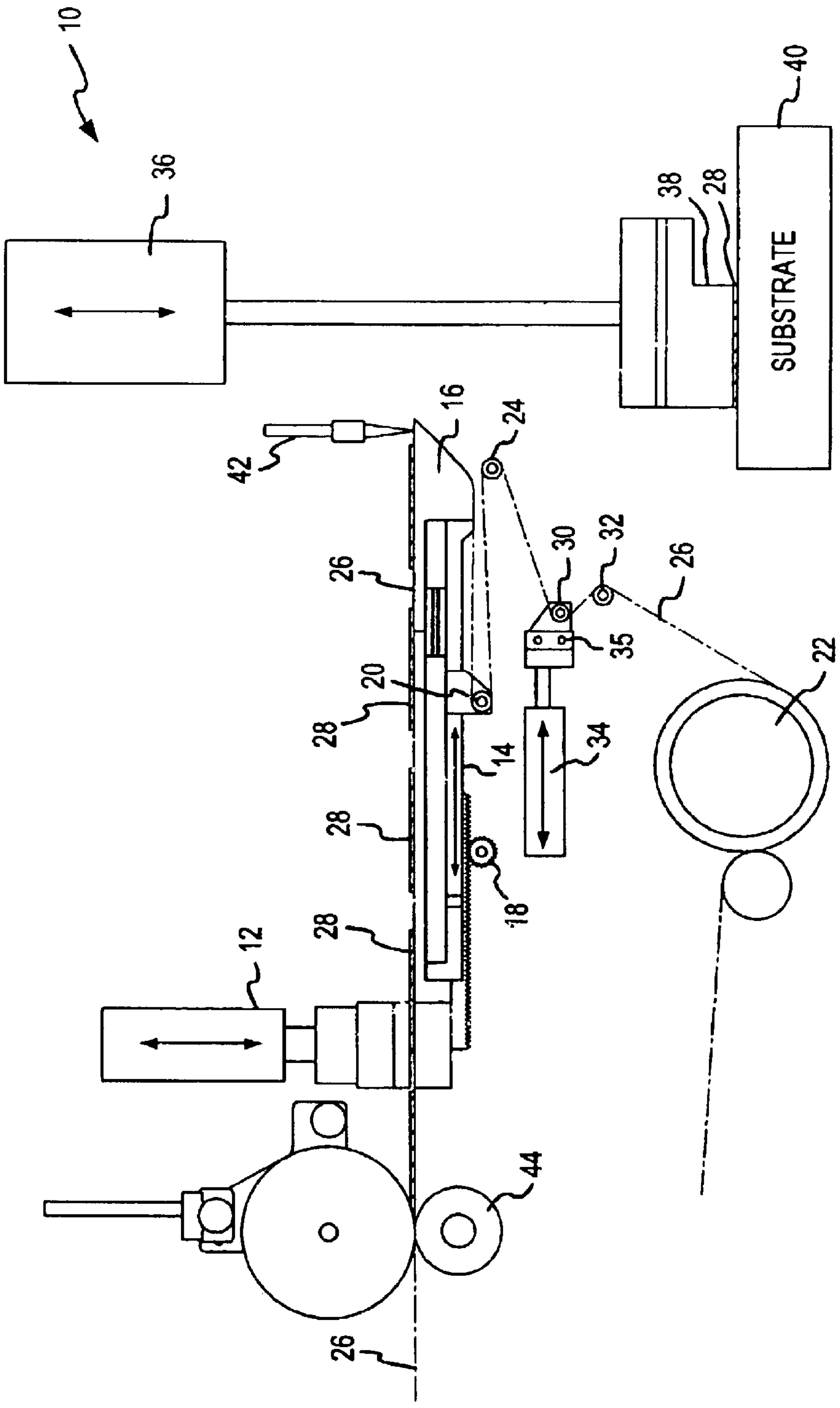
FIG. 5 is a schematic side elevational view of the apparatus of the present invention shown with the vacuum chuck applying a component to a substrate.

FIG. 5 is a schematic side elevational view of apparatus 10 of the present invention shown with vacuum chuck 38 applying adhesive component 28 to substrate 40. Tamp assembly 36 extends vacuum chuck 38 downward to place adhesive component 28 onto substrate 40. After placement of adhesive component 28 onto substrate 40, tamp assembly 36 retracts the vacuum chuck 38 to its original home position. The entire cycle is then repeated beginning with the release of clamp 12 and extension of retracting blade 16 by blade drive gear 18, shown in this embodiment, to a predetermined position which is performed with the aid of sensor 42 as previously described. Meanwhile, feed drive roller 22 is simultaneously advanced to a predetermined position, the movement of which is again aided by sensor 42, in order to properly position the next adhesive component 28 for removal. As previously stated above, the advancement of carrier 26 and movement of retracting blade 16 can occur simultaneously and independently through the use of electronic and/or mechanical gearing. This simultaneous and independent movement of carrier 26 and retracting blade 16 eliminates an entire step which is required in current prior art apparatus.

As previously described above with reference to FIG. 1, tensioning element 34 may also be included as part of apparatus 10. Guide roller 30 is attached to tensioning element 34 which represents a spring-type feature that keeps tension on carrier 26 during the retracting process. Functional elements for the spring type feature may include, but are not limited to, a spring actuator, an electric actuator, or a gas cylinder. During the process of removing adhesive components 28 from carrier 26, the best results are obtained when carrier 26 is kept tight around retracting blade 16. Tensioning element 34 guarantees this tightness even in the face of a carrier that has properties that make it inconsistent or properties that make it stretch throughout a roll of the material which comprises the carrier.

FIG. 6 is a magnified schematic side elevational view of the retracting blade 16 of the present invention shown in both the retracted and extended positions.

Figure 6A:
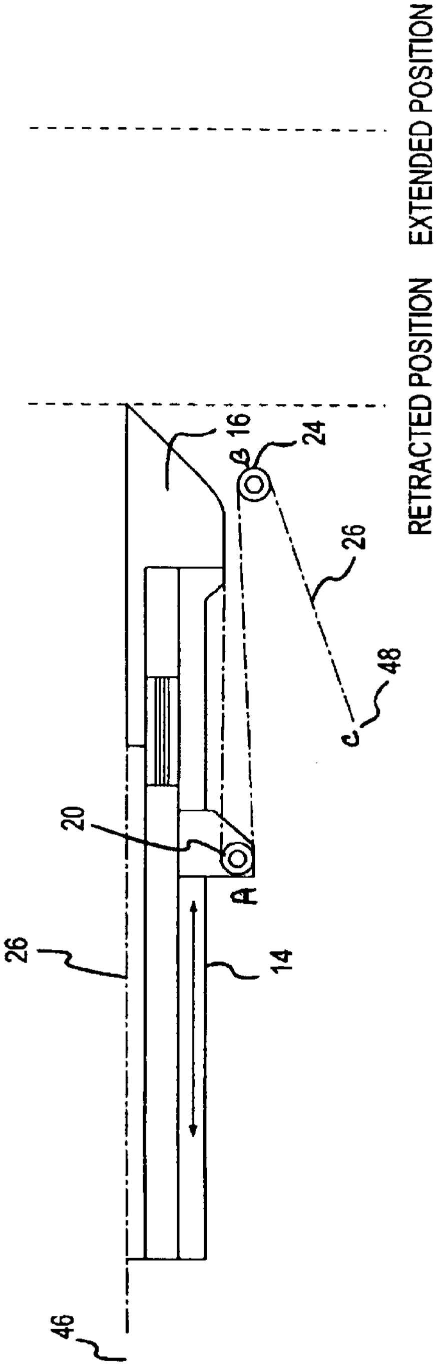
FIG. 6 is a schematic side elevational view of the retracting blade of the present invention shown in both the retracted and extended positions.

FIG. 6*a* shows retracting blade 16 of retracting blade assembly 14 in a retracted position. First roller 20 is affixed to, and rotates with movement of, retracting blade 16, while second roller 24 is permanently positioned and further defines a portion of the path of carrier 26 when it is threaded around second roller 24. Point F 46 and point C 48 denote points where carrier 26 is captured such that carrier 26 cannot be further extended or retracted between those points during capture. Capture point F 46 may comprise a web clamp as previously described above with reference to FIGS. 1–5, a break or similar functioning device. Further, capture point C 48 may comprise a feed track roller and pinch roller combination previously described above with reference to FIGS. 1–5, or any other similarly functioning device including, but not limited to, a linear actuator, a clamp, or a tractor feed with holes formed through the carrier.

Figure 6B:
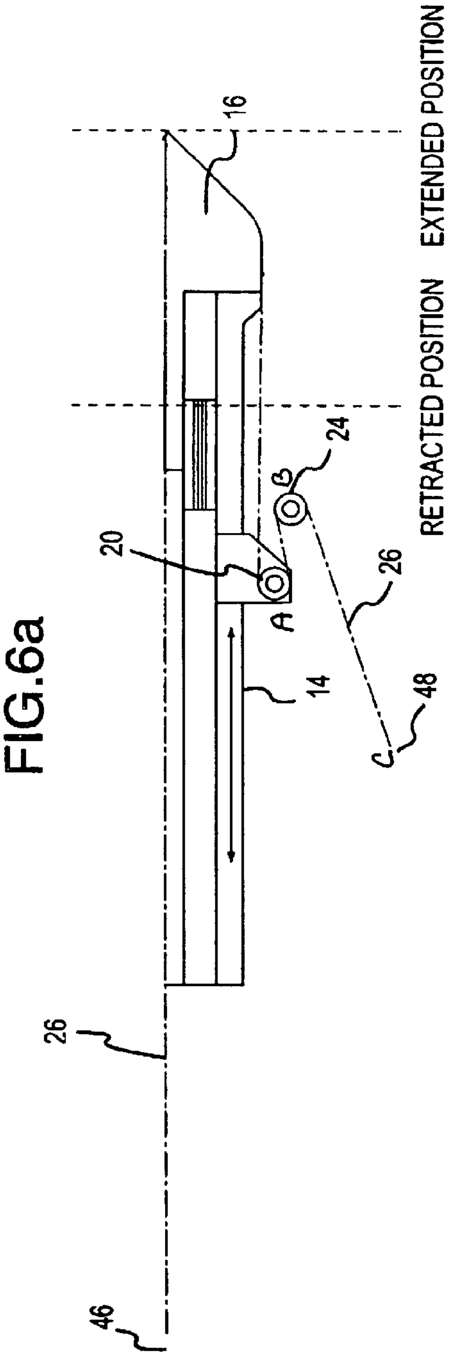

FIG. 6*b* shows retracting blade 16 of retracting blade assembly 14 at its fully extended position. When retracting blade 16 moves from its retracted position (FIG. 6*a*) to its extended position (FIG. 6*b*), the total length of carrier 26 does not change because it is captured at point F 46 and point C 48. This is possible because the length of carrier 26 between point F 46 and first roller 20 increases in an amount equal to the decrease in length of carrier 26 from first roller 20 to second permanently affixed roller 24. An important result of this design is that the motion of retracting blade 16 does not affect the position of any adhesive component 28 attached to carrier 26. Accordingly, retracting blade 16 and carrier 26 can be moving both simultaneously and independently of one another.

Figure 7:
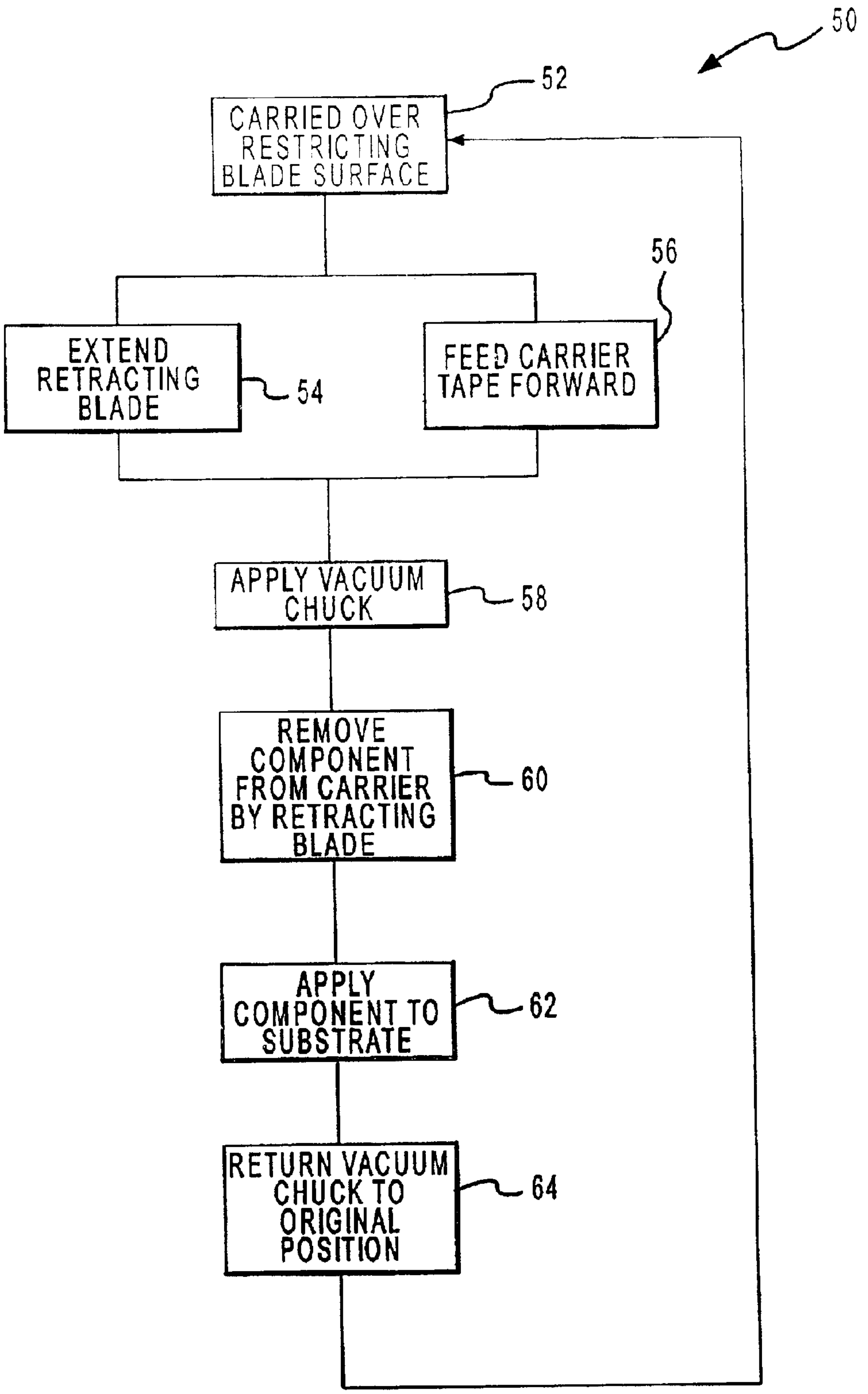
FIG. 7 is a flow chart showing the method of the present invention for removing an adhesive backed component from a carrier and applying the component onto a substrate.

Turning now to FIG. 7, there is a flow chart showing the method 50 of the present invention for removing an adhesive-backed component from a carrier and applying the component onto a substrate. In step 52, the carrier tape is threaded or positioned over a top surface of the retracting blade. Next, the retracting blade is extended in step 54 simultaneously with step 56 which comprises feeding the carrier tape forward across the top surface of the retracting blade. As previously stated, the simultaneous employment of steps 54 and 56 eliminate one whole step required in the current prior art, thereby increasing efficiency by reducing overall cycle time.

Next, a vacuum chuck is applied in step 58 and an adhesive component is removed from the carrier in step 60 with the vacuum chuck by retracting the retracting blade so that the adhesive component attached to the vacuum chuck can be applied to a substrate in step 62. Finally, the vacuum chuck is returned to its original position in step 64 and the entire cycle is then continuously repeated. Continued repetition of the cycle can occur by automating the apparatus of the present invention.

The method of the present invention may also include utilizing one or more sensors for determining the predetermined position of the extended retracting blade and carrier tape. Further, the method of the present invention may also include the application of a tensioning element somewhere in the apparatus to maintain the carrier at a predetermined tension.

It should be understood that the foregoing description is of exemplary embodiments of the invention and that the invention is not limited to the specific forms, structures or methods shown or described herein. Various modifications may be made in the design, arrangement, and type of elements and structures disclosed herein, as well as the steps of making and using the invention, without departing from the scope of the invention as expressed in the appended claims.

We Claim:

1. An apparatus for removing an adhesive backed component from a carrier and applying the component onto a substrate comprising:

means for retaining a supply of a carrier containing adhesive backed components;

first means for capturing said carrier;

first tensioning means for maintaining a continuous minimum tension on the carrier located between the means for retaining a supply of the carrier and the first means for capturing said carrier;

second means for capturing said carrier;

a retracting blade assembly located between said first and second capturing means having a top surface of a retracting blade for retaining a portion of said carrier;

a first roller located on a bottom surface of said retracting blade which is affixed to, and moves with, said retracting blade, and which rotates while said retracting blade is in motion; and a second roller located beneath said retracting blade which is permanently affixed in place between said first roller and said second capturing means and which rotates when said carrier is moved through said apparatus.

2. The apparatus of claim 1 wherein said second capturing means comprises at least one of a feed drive roller and pinch roller combination, a take up feature with an encoder, a linear actuator with a clamp, or a tractor feed used in combination with holes formed through said carrier.

3. The apparatus of claim 1 wherein said first capturing means comprises a web clamp which clamps a top surface and a bottom surface of the carrier in place.

4. The apparatus of claim 1 further comprising a second tension element located beneath said second roller that is capable of applying tension to a portion of said carrier such that said carrier maintains a predetermined tension.

5. The apparatus of claim 1 wherein at least one of said first and second capturing means comprises a brake.

6. The apparatus of claim 1 wherein said carrier comprises a tape capable of being threaded through said apparatus.

7. The apparatus of claim 1 wherein said retracting blade assembly further comprises at least one of an element or elements that produce a controlled linear motion for moving said top surface of said retracting blade.

8. The apparatus of claim 7 wherein said at least one element or elements comprises at least one of a rack and pinion with a gear motor, a linear motor, a voice coil actuator, or a motor and belt configuration.

9. The apparatus of claim 1 wherein movement of said retracting blade does not result in movement of said carrier located on the top surface of said retracting blade.

10. The apparatus of claim 1 wherein said retracting blade and said carrier move simultaneously and independently of one another.

11. The apparatus of claim 1 wherein said retracting blade extends to a predetermined position while said second capturing means advances said carrier to a predetermined location.

12. The apparatus of claim 11 further comprising a sensor positioned over said retracting blade wherein said sensor is capable of sensing at least one of a feature of said component or a portion of said carrier.

13. The apparatus of claim 12 wherein said predetermined location of said carrier is based upon input from said sensor.

14. The apparatus of claim 1 wherein control of linear acceleration and velocity of said carrier is controlled by said second capturing means and is synchronized with linear acceleration and velocity of said retracting blade.

15. The apparatus of claim 14 wherein computer software is used to program said control and synchronization.

16. The apparatus of claim 14 wherein said synchronization is performed by at least one of electrical and mechanical means.

* * * * *